B. MULVILLE.
RUNNER ATTACHMENT FOR VEHICLES.
APPLICATION FILED APR. 14, 1915.
1,198,748.
Patented Sept. 19, 1916.
2 SHEETS—SHEET 1.
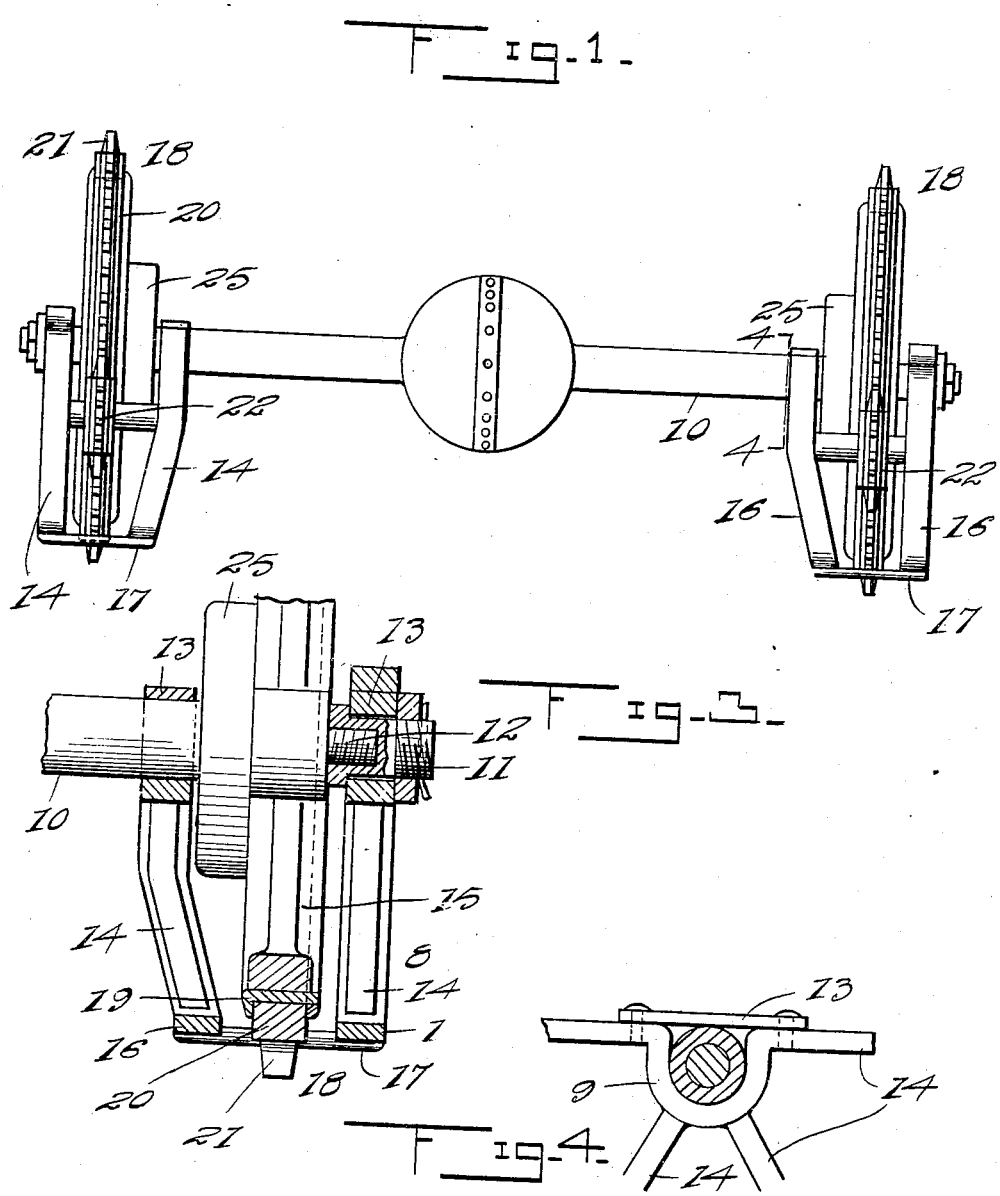

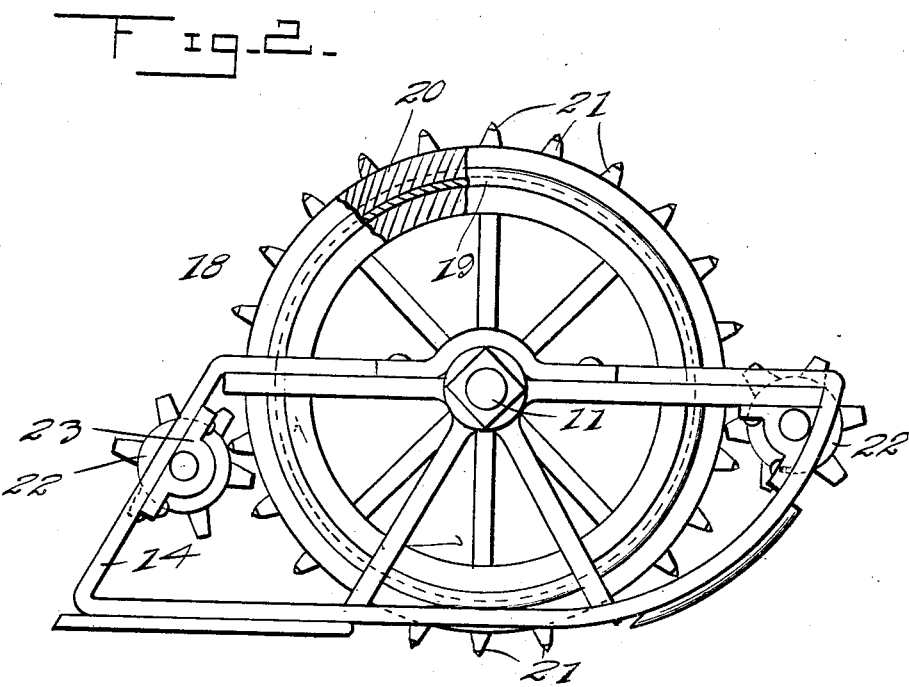

UNITED STATES PATENT OFFICE.

BARTHOLOMEW MULVILLE, OF NEW YORK, N. Y.

RUNNER ATTACHMENT FOR VEHICLES.

1,198,748.      Specification of Letters Patent.      Patented Sept. 19, 1916.

Application filed April 14, 1915. Serial No. 21,392.

*To all whom it may concern:*

Be it known that I, BARTHOLOMEW MULVILLE, a citizen of the United States, residing at New York, in the county of New York and State of New York, have invented certain new and useful Improvements in Runner Attachments for Vehicles; and I do hereby declare the following to be a full, clear, and exact description of the invention, such as will enable others skilled in the art to which it appertains to make and use the same.

This invention has for its primary object to provide novel and efficient runners which may be quickly and conveniently attached to the front and rear axles of motor vehicles.

Another object is the provision of a novel type of traction element designed to replace the tires of the rear or driving wheels of the motor vehicle, whereby the latter may be propelled over snow and ice.

With these and other objects in view, the invention consists in the novel construction, arrangement and formation of parts as will be hereinafter specifically described, claimed and illustrated in the accompanying drawings, in which:

Figure 1 represents a rear elevation of the rear construction of a motor vehicle illustrating the improved runners attached thereto. Fig. 2 represents a side elevation of one of the rear runners and traction elements removed. Fig. 3 represents a vertical central sectional view through one of the rear runners and wheels removed, and, Fig. 4 represents a fragmental sectional view on the line 4—4 of Fig. 1.

Referring to the drawing in detail, wherein similar reference numerals designate corresponding parts throughout the several views, the numeral 8 designates the rear runners each of which includes a pair of spaced hubs 9 having apertures therein to permit of the insertion of the rear axle casing 10 and spindle extension 11 secured to the spindle 12 of the rear axle. The hubs are closed by bearing plates 13 removably secured over the openings therein, whereby the axle casing and axle extension 11 are secured in position. A plurality of radiating spokes or braces 14 are secured to the hubs 9 upon opposite sides of each rear or driving wheel 15 of the vehicle and are secured at their outer extremities to a pair of spaced runner strips 16, the opposite extremities of which are directed upwardly and secured upon the horizontally disposed spokes or braces 14 of the inner and outer series. Runner plates 17 are secured in spaced relation to the under surfaces of the strips 16 to provide an opening through which the lower portion of the rim of the wheel 15 projects.

An annular traction element, designated generally by the numeral 18, is suitably secured to each wheel rim 19 and includes an annular body or rim 20 snugly fitting the wheel rim 19 and a plurality of equi-distant gear teeth 21 constituting anti-slipping cleats adapted for engagement with the snow or ice. Idler gear wheels 22 are rotatably supported in the runner 8 in bearings 23 and mesh with the teeth or cleats of the traction element 18 at points forwardly and rearwardly of the latter.

In attaching the rear runners to a motor vehicle, the tires on the rear or driving wheels are removed and are replaced by the traction elements 18. The hub caps are also removed and replaced by the extensions 11 and the rear runners 8 are secured in position upon the casing 10 and extensions 11 by the plates 13. It will be noted that the inner series of spokes or braces 14 of the rear runners are offset at their inner ends and secured to the ends of the axle casing inwardly of the brake drums 25.

In operation, the power from the vehicle motor is transmitted to the rear wheels 15 through the usual transmission, thus rotating the traction elements 18 and propelling the vehicle. The teeth or cleats 21 prevent the traction elements from slipping upon the snow or ice and are effectively cleaned by the idler gear wheels 22 engaging therewith.

Having thus described the invention what is claimed as new, is:

A runner attachment for motor vehicles, including a pair of hubs, a plurality of spokes radiating from said hubs, runner strips carried by said spokes, runner plates secured to said strips, annular traction elements attachable to the wheels of a motor vehicle, gear teeth on said traction elements, and gear wheels meshing with the teeth of said traction elements for cleaning the latter.

In testimony whereof I affix my signature in presence of two witnesses.

BARTHOLOMEW MULVILLE.

Witnesses:
SIEGFRIED LANDAU,
AGNES LANDAU.

Copies of this patent may be obtained for five cents each, by addressing the "Commissioner of Patents, Washington, D. C."